United States Patent
Kobayashi et al.

(10) Patent No.: US 9,442,479 B2
(45) Date of Patent: Sep. 13, 2016

(54) WIRE ELECTRIC DISCHARGE MACHINE CONTROLLER, WIRE ELECTRIC DISCHARGE MACHINE, AND WIRE ELECTRIC DISCHARGE MACHINING METHOD

(71) Applicant: FANUC CORPORATION, Minamitsuru-gun, Yamanashi (JP)

(72) Inventors: Masanori Kobayashi, Yamanashi (JP); Koji Suzuki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 386 days.

(21) Appl. No.: 14/079,176

(22) Filed: Nov. 13, 2013

(65) Prior Publication Data

US 2014/0135975 A1   May 15, 2014

(30) Foreign Application Priority Data

Nov. 13, 2012   (JP) .................. 2012-249606

(51) Int. Cl.
| | |
|---|---|
| G05B 19/18 | (2006.01) |
| G05B 19/404 | (2006.01) |
| B23H 7/20 | (2006.01) |
| B23H 7/06 | (2006.01) |

(52) U.S. Cl.
CPC .............. *G05B 19/18* (2013.01); *B23H 7/20* (2013.01); *G05B 19/404* (2013.01); *B23H 7/06* (2013.01); *G05B 2219/50331* (2013.01)

(58) Field of Classification Search
CPC .................................................. G05B 19/18
USPC ............................. 700/162, 110; 219/69.1
See application file for complete search history.

(56) References Cited

U.S. PATENT DOCUMENTS

| | | | |
|---|---|---|---|
| 2002/0002417 A1 | 1/2002 | Irie | |
| 2004/0172154 A1 | 9/2004 | Maki | |
| 2008/0251500 A1 | 10/2008 | Hiraga et al. | |
| 2009/0143891 A1* | 6/2009 | Lin ..................... | B23H 1/00 700/110 |
| 2011/0226742 A1 | 9/2011 | Onodera et al. | |
| 2014/0116991 A1 | 5/2014 | Sugie et al. | |

FOREIGN PATENT DOCUMENTS

| | | |
|---|---|---|
| CN | 1485175 A | 3/2004 |
| CN | 101602130 A | 12/2009 |
| CN | 102239023 A | 11/2011 |

(Continued)

OTHER PUBLICATIONS

Office Action issued May 20, 2015, corresponding to Chinese patent application No. 201310556505.1.

(Continued)

*Primary Examiner* — Tejal Gami
(74) *Attorney, Agent, or Firm* — Hauptman Ham, LLP

(57) ABSTRACT

A wire electric discharge machining program is analyzed and a target shape for a workpiece is created. Multiple amounts of adjustment by which the amount of wire radius compensation for a wire electrode is adjusted are set. One or more desired ones are selected from the amounts of adjustment, and the amount of wire radius compensation is calculated by adding the selected amount(s) of adjustment to the amount of wire radius compensation. A machining route which is offset from the created target shape by the calculated amount of wire radius compensation is created.

9 Claims, 3 Drawing Sheets

(56) References Cited

FOREIGN PATENT DOCUMENTS

| | | |
|---|---|---|
| EP | 0920944 A2 | 6/1999 |
| EP | 1980353 A2 | 10/2008 |
| EP | 2133167 A2 | 12/2009 |
| EP | 2327498 A2 | 6/2011 |
| JP | 6440220 A | 2/1989 |
| JP | 4-2414 A | 1/1992 |
| JP | 760551 A | 3/1995 |
| JP | 8314518 A | 11/1996 |
| JP | 10277843 A | 10/1998 |
| JP | 11165220 A | 6/1999 |
| JP | 2004-148472 A | 5/2004 |
| JP | 201023138 A | 2/2010 |
| JP | 2011110649 A | 6/2011 |
| JP | 5289643 B1 | 9/2013 |

OTHER PUBLICATIONS

Office Action mailed May 27, 2014, corresponds to Japanese patent application No. 2012-249606.
Decision to Grant a Patent mailed Sep. 30, 2014, corresponding to Japanese patent application No. 2012-249606.

* cited by examiner

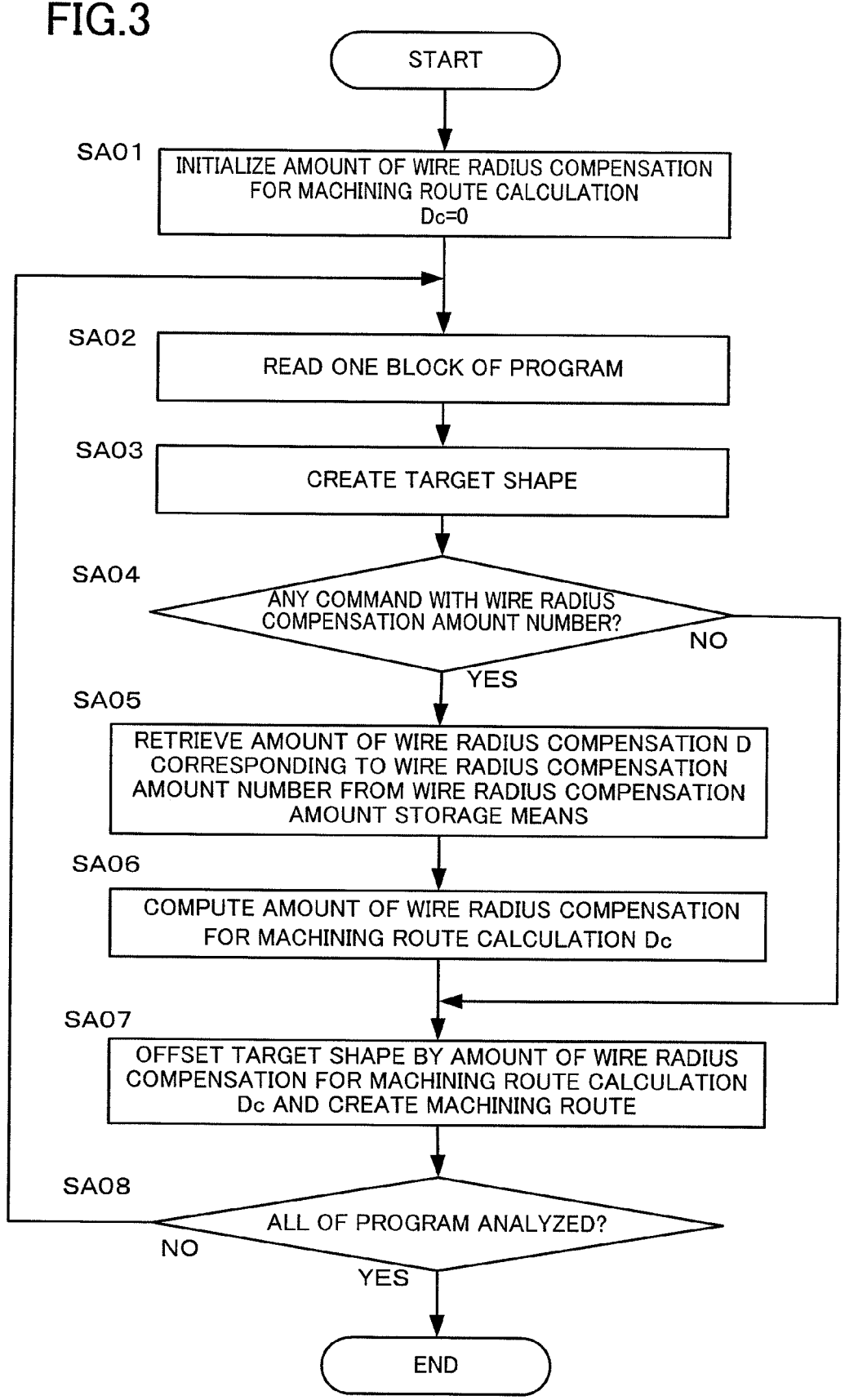

WIRE ELECTRIC DISCHARGE MACHINE CONTROLLER, WIRE ELECTRIC DISCHARGE MACHINE, AND WIRE ELECTRIC DISCHARGE MACHINING METHOD

RELATED APPLICATIONS

The present application is based on and claims priority to Japanese Application Number 2012-249606, filed Nov. 13, 2012, the disclosure of which is hereby incorporated by reference herein in its entirety.

BACKGROUND OF THE INVENTION

1. Field of the Invention

The present invention relates to a wire electric discharge machine controller, wire electric discharge machine, and wire electric discharge machining method that permit change of the amount of compensation for wire radius compensation to be applied to a machining route programmed in a machining program.

2. Description of the Related Art

In machining of a workpiece with a wire electric discharge machine, if machining is conducted with the traveling route of a wire electrode being set as programmed in a machining program, the resulting size of the workpiece becomes smaller by the radius of the wire electrode plus discharge gap. To address this, a machining route on which the wire electrode moves is typically created by applying a certain amount of wire radius compensation (wire electrode radius plus discharge gap) to the route of the machining program. The amount of such wire radius compensation is determined through preliminary machining experiments in consideration of conditions including wire electrode type and/or machining speed.

Japanese Patent Application Laid-Open No. 4-2414 discloses an offset setting device for a wire-cut electric discharge machine that is capable of modifying the finished size of a workpiece by making modification to the amount of wire radius compensation. This device is intended to cut a workpiece into an intended shape by generating electric discharge between the wire electrode and the workpiece, and preprograms a reference offset for the wire electrode for a workpiece of interest, modifies the reference offset with an amount of modification, and sets the modified value as the amount of offset.

When the finished size of the workpiece differs from the intended size as a result of machining using the calculated amount of wire radius compensation, a machining result with the intended size can be yielded by modifying the amount of wire radius compensation by the difference between the machining result (i.e., the finished size of the workpiece) and the intended size. Another possible way to obtain a machining result of the intended size is to include a finishing allowance (i.e., an amount by which wire radius compensation is modified) in the workpiece size and modify the amount of wire radius compensation by the finishing allowance.

The offset setting device for a wire electric discharge machine disclosed by Japanese Patent Application Laid-Open No. 4-2414 only uses an amount of offset modification for one purpose. In a case where different amounts of offset modification should be separately used for different purposes, such as adjusting the amount of discharge gap in relation to the difference between the nominal material of a workpiece and/or a wire electrode and its/their actual material, adjusting the amount of machining in consideration of coefficient of expansion associated with workpiece temperature, and specifying the amount of finishing machining, the amounts of modification for such individual purposes need to be summed up. However, summation of the amounts of compensation for different purposes makes the original individual amounts of modification indistinguishable, resulting in the difficulty of modifying only one of the amounts of modification.

In a case where an amount by which the amount of wire radius compensation is modified due to a finishing allowance is set, the finishing allowance (i.e., the amount by which the amount of wire radius compensation is modified) can be specified at the beginning of a machining program or at a number of points in the machining program in order to set different finishing allowances for different portions being machined.

If the workpiece is not finished in the intended size as a result of machining with finishing allowances thus specified in the machining program, the finishing allowances need to be further changed by the difference between the machining result (i.e., the workpiece size) and the intended size.

Change to the finishing allowances is however burdensome as it involves alteration to the machining program and also poses a possible risk of omitting to make a modification when the program should be modified in many places. Also, when the sum of individual amounts of modification for different purposes is set as the amount by which the amount of wire radius compensation is modified, it is difficult to modify only the amount of modification for a particular purpose because the original individual amounts of modification before being summed up become indistinguishable.

SUMMARY OF THE INVENTION

In view of such drawbacks, an object of the present invention is to provide a wire electric discharge machine controller, wire electric discharge machine, and wire electric discharge machining method that facilitate change of amounts of wire radius compensation for multiple different purposes by preparing multiple amounts by which the amount of wire radius compensation is modified according to purpose or application and correcting the amount of wire radius compensation with any of those amounts, without involving modification to an existing machining program.

A wire electric discharge machine according to the present invention or a wire electric discharge machine controlled by a controller according to the present invention moves a wire electrode relative to a workpiece according to a machining program and machines the workpiece into a desired target shape. The wire electric discharge machine or the controller for controlling the electric discharge machine includes: machining program storage mean for storing the machining program; machining program analyzing means for analyzing the machining program stored in the machining program storage means; target shape creating means for creating a target shape for the workpiece based on a result of analysis by the machining program analyzing means; wire radius compensation amount storage means for storing an amount of wire radius compensation for the wire electrode; wire radius compensation adjustment amount setting means for setting a plurality of amounts of wire radius compensation adjustment by which the amount of wire radius compensation for the wire electrode is adjusted; wire radius compensation adjustment amount storage means for storing the plurality of amounts of wire radius compensation adjustment set by the wire radius compensation adjustment amount setting means; wire radius compensation adjustment amount selecting means for selecting one or more desired amounts of wire radius compensation adjustment from the plurality of amounts of wire radius compensation adjustment stored in the wire radius compensation adjustment amount storage means; route-calculation wire radius compensation amount computing means for computing an amount of wire radius compensation for machining route calculation by adding the amounts of wire radius compensation adjustment, selected by the wire radius compensation adjustment amount selecting means, to the amount of wire radius compensation; and machining route creating means for creating a machining route which is offset from the target shape created by the target shape creating means by the amount of wire radius compensation for machining route calculation that has been computed. The wire electric discharge machine according to the invention further includes driving means for moving the wire electrode relative to the workpiece according to the machining route created by the machining route creating means.

A wire electric discharge machining method according to the present invention is a method for moving a wire electrode relative to a workpiece according to a machining program and machining the workpiece into a desired target shape, comprising the steps of: analyzing the machining program; creating a target shape for the workpiece based on a result of analysis of the machining program; storing an amount of wire radius compensation for the wire electrode; setting a plurality of amounts of wire radius compensation adjustment by which the amount of wire radius compensation for the wire electrode is adjusted; storing the plurality of amounts of wire radius compensation adjustment that have been set; selecting one or more desired amounts of wire radius compensation adjustment from the stored amounts of wire radius compensation adjustment; computing an amount of wire radius compensation for machining route calculation by adding the selected amounts of wire radius compensation adjustment to the amount of wire radius compensation; creating a machining route which is offset from the created target shape by the computed amount of wire radius compensation for machining route calculation; and moving the wire electrode relative to the workpiece according to the created machining route.

At least one of the plurality of amounts of wire radius compensation adjustment may either be set by the wire radius compensation adjustment amount setting means based on a dimensional difference between the desired target shape for the workpiece and an actually-machined shape of the workpiece, or set by the wire radius compensation adjustment amount setting means as a finishing allowance with respect to the desired target shape for the workpiece.

According to the present invention, there can be provided a wire electric discharge machine controller, wire electric discharge machine, and wire electric discharge machining method that facilitate change of amounts of wire radius compensation for multiple different purposes by preparing multiple amounts by which the amount of wire radius compensation is modified according to purpose or application and correcting the amount of wire radius compensation with those amounts, without involving modification to an existing machining program.

BRIEF DESCRIPTION OF THE DRAWINGS

The above and other objects and features of the present invention will be apparent from the following description of an embodiment with reference to the appended drawings, in which:

FIG. 3 is a flowchart illustrating the process flow of creating a machining route to be executed by the machining route creation apparatus shown in FIG. 2.

DETAILED DESCRIPTION OF THE PREFERRED EMBODIMENT

Figure 1:
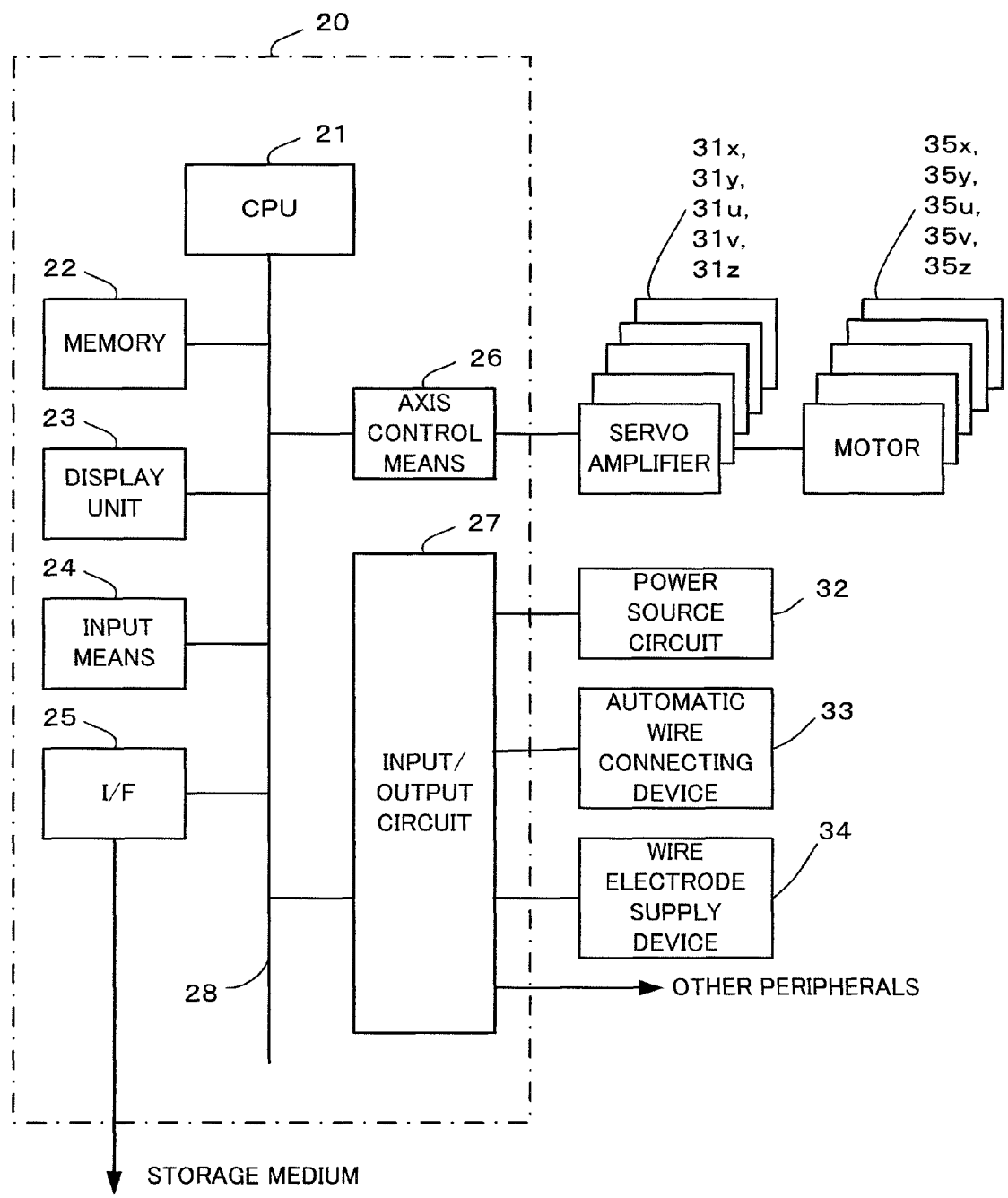
FIG. 1 is a block diagram illustrating a wire electric discharge machine controlled by a controller.

FIG. 1 is a block diagram illustrating a wire electric discharge machine controlled by a controller.

A controller 20, which controls the wire electric discharge machine and is implemented as a numerical controller or the like, includes a processor (CPU) 21, a memory 22 which is composed of ROM, RAM or the like, a display unit 23, input unit 24 such as a keyboard, an interface 25 through which a machining program and the like are input from or output to an external storage medium, axis control unit 26 for controlling axes, and an input/output circuit 27, which are coupled with the processor 21 by a bus 28.

The axis control unit 26 is constituted by a processor, memory, and so forth, and controls servo motors $35x$, $35y$, $35u$, $35v$, and $35z$, which respectively drive X axis and Y axis on which a lower wire guide (not shown) is driven in X-axis and Y-axis directions which are orthogonal to each other, U axis and V axis on which an upper wire guide (not shown) is driven in X-axis and Y-axis directions which are orthogonal to each other, and Z axis on which the upper wire guide (not shown) is moved in the direction orthogonal to the X axis and Y axis. The axis control unit 26 performs feedback control based on a position, speed, and electric current of each of those axes. The axis control unit 26 is connected with the servo motors $35x$, $35y$, $35u$, $35v$, and $35z$ for the respective axes via servo amplifiers $31x$, $31y$, $31u$, $31v$, and $31z$ for the respective axes. Each of the servo motors $35x$, $35y$, $35u$, $35v$, and $35z$ is equipped with a position/speed detector so that detected position and speed are fed back to the corresponding axis control unit 26, though its depiction is omitted in FIG. 1.

The input/output circuit 27 is further connected with a power source circuit 32 for applying a voltage to cause electrical discharge between the wire electrode (not shown) of the wire electric discharge machine and the workpiece (not shown), an automatic wire threading device 33 for inserting a wire electrode into a machining start hole in the workpiece, a wire electrode supply device 34 for supplying a wire electrode, and other peripheral devices.

The aforementioned configuration of a wire electric discharge machine is well known.

To perform wire electric discharge machining, an operator first sets the thickness and material of the workpiece to be machined and wire electrode type into the controller 20 through the input unit 24 of the controller 20. The operator also selects and sets machining conditions that provide a desired machining precision through the input unit 24 using a machining condition setting screen on the display unit 23 of the controller 20. Selection and setting of machining conditions may also be specified in a machining program. Additionally, as the actual material of workpieces and/or wire electrodes can vary among manufacturers of workpiece materials and/or wire electrodes, in embodiments of the present invention, adjustment of the amount of discharge gap in relation to the difference between the nominal material of a workpiece and/or wire electrode and its/their actual material, adjustment of the amount of machining in consideration of coefficient of expansion associated with workpiece temperature, and designation of the amount of finishing machining, for example, are done at the time of creating a machining route as mentioned later.

Figure 2:
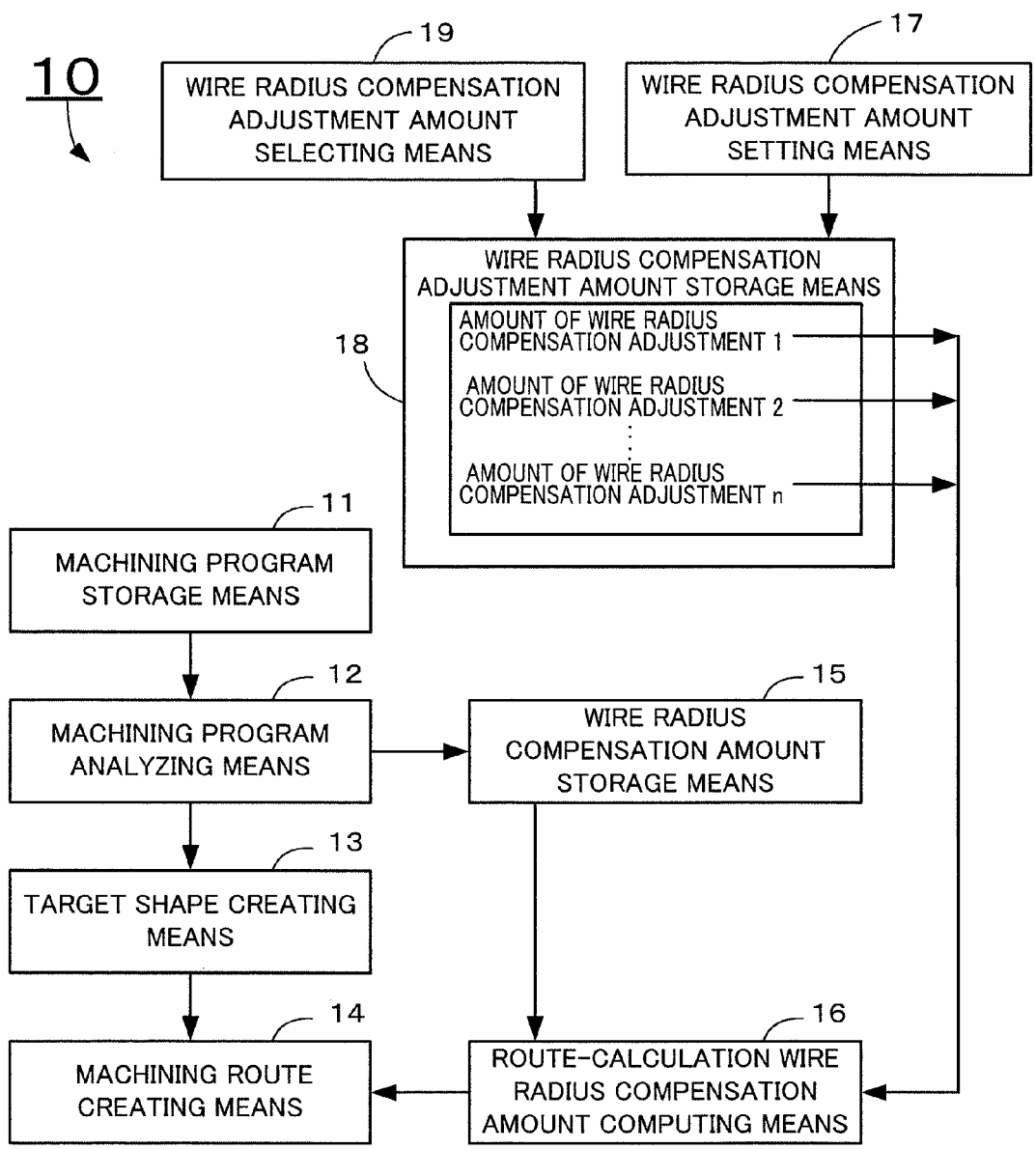
FIG. 2 is a block diagram illustrating a machining route creation apparatus.

A machining route creation apparatus according to the present invention will now be described with reference to the block diagram of FIG. 2.

A machining route creation apparatus 10 is an apparatus for creating a machining route which is executed by the controller 20 of the wire electric discharge machine (FIG. 1). The wire electric discharge machine moves a wire electrode relative to a workpiece according to a machining program to machine the workpiece into a desired shape.

The machining route creation apparatus 10 includes machining program storage unit 11 for storing a machining program, machining program analyzing unit 12 for analyzing the machining program stored in the machining program storage unit 11, target shape creating unit 13 for creating a target shape for the workpiece based on the result of analysis by the machining program analyzing unit 12, wire radius compensation amount storage unit 15 for storing an amount of wire radius compensation for the wire electrode, wire radius compensation adjustment amount setting unit 17 for setting a plurality of amounts of wire radius compensation adjustment by which the amount of wire radius compensation for the wire electrode is adjusted, wire radius compensation adjustment amount storage unit 18 for storing the plurality of amounts of wire radius compensation adjustment that have been set, wire radius compensation adjustment amount selecting unit 19 for selecting desired ones from among the amounts of wire radius compensation adjustment stored in the wire radius compensation adjustment amount storage unit 18, route-calculation wire radius compensation amount computing unit 16 for computing an amount of wire radius compensation for machining route calculation by adding the selected amounts of wire radius compensation adjustment to the amount of wire radius compensation, and machining route creating unit 14 for creating a machining route which is offset from the target shape by the amount of wire radius compensation for machining route calculation.

The wire radius compensation adjustment amount setting unit 17 for setting a plurality of amounts of wire radius compensation adjustment by which the amount of wire radius compensation for the wire electrode is adjusted, the wire radius compensation adjustment amount storage unit 18 for storing the plurality of amounts of wire radius compensation adjustment that have been set, and the route-calculation wire radius compensation amount computing unit 16 for computing an amount of wire radius compensation for machining route calculation by adding one or more amounts of wire radius compensation adjustment, selected by the wire radius compensation adjustment amount selecting unit 19 from the stored amounts of wire radius compensation adjustment, to the amount of wire radius compensation are primary elements of the present invention and the remaining configuration is included in well-known machining route creation apparatuses.

The machining route creation apparatus 10 may be constituted by the controller 20 shown in FIG. 1, which controls a wire electric discharge machine. Alternatively, the machining route creation apparatus10 may be configured to be separated from the controller 20. The wire radius compensation adjustment amount setting unit 17 and the wire radius compensation adjustment amount selecting unit 19, which are constituents of the machining route creation apparatus 10, may use input means with which a well-known wire electric discharge machine is equipped, such as a keyboard.

Alternatively, a desired amount of wire radius compensation adjustment may be selected from the wire radius compensation adjustment amount storage unit 18 with a code specified in a machining program.

In order to provide a wire electric discharge machine (or a wire electric discharge machine controller) that is capable of changing amounts of wire radius compensation for different purposes without involving modification to an existing machining program, the amount of wire radius compensation for machining route calculation Dc is determined by preparing multiple amounts by which the amount of wire radius compensation D is modified according to purpose or application and correcting the amount of wire radius compensation with any of those amounts. Multiple amounts of wire radius compensation adjustment by which those amounts of wire radius compensation are adjusted are set by way of the wire radius compensation adjustment amount setting unit 17 and stored in the wire radius compensation adjustment amount storage unit 18.

Further, as at least one of the amounts of wire radius compensation adjustment, the dimensional difference between the desired target shape for the workpiece and the actually-machined shape of the workpiece is stored in the wire radius compensation adjustment amount storage unit 18 by use of the wire radius compensation adjustment amount setting unit 17. Alternatively, as at least one of the amounts of wire radius compensation adjustment, a finishing allowance with respect to the desired target shape for the workpiece is stored in the wire radius compensation adjustment amount storage unit 18 by use of the wire radius compensation adjustment amount setting unit 17. Alternatively, both the dimensional difference between the desired target shape for the workpiece and its actually-machined shape, and a finishing allowance with respect to the desired target shape for the workpiece may be stored in the wire radius compensation adjustment amount storage unit 18 by use of the wire radius compensation adjustment amount setting unit 17.

The plurality of amounts of wire radius compensation adjustment that are set using the wire radius compensation adjustment amount setting unit 17 and stored in the wire radius compensation adjustment amount storage unit 18 are quantities that are independent from each other and that can be used as offsets for the wire electrode by simple addition of multiple amounts of wire radius compensation adjustment, which are set for different purposes of adjustment.

The operator or other entity then selects from the amounts of wire radius compensation adjustment stored in the wire radius compensation adjustment amount storage unit 18 through the wire radius compensation adjustment amount selecting unit 19 according to purposes. Amounts of wire radius compensation adjustment that are being used for adjustment through the wire radius compensation adjustment amount selecting unit 19 are indicated on the machining route creation apparatus 10 or a display (not shown) of the wire electric discharge machine, so that the operator can easily understand with which ones of the amounts of wire radius compensation adjustment the amount of wire radius compensation is being adjusted.

FIG. 3 illustrates the process flow of creating a machining route on which the wire electrode is moved relative to the workpiece. The flow will be described below per step.

[Step SA01] The amount of wire radius compensation for machining route calculation Dc is initialized (Dc=0).

[Step SA02] One block of the machining program stored in the machining program storage unit 11 is read out.

[Step SA03] A target shape is created according to the block.

[Step SA04] Decision is made whether the block contains any command with a wire radius compensation amount number. If there is a command with a wire radius compensation amount number (YES), the flow proceeds to step SA05; if there is no such command (NO), the flow proceeds to step SA07.

[Step SA05] The amount of wire radius compensation D corresponding to the wire radius compensation amount number is retrieved from the wire radius compensation amount storage unit 15.

[Step SA06] The amount of wire radius compensation for machining route calculation Dc is updated by adding the amount of wire radius compensation D retrieved at step SA05 and one or more amounts of wire radius compensation adjustment, selected by the wire radius compensation adjustment amount selecting unit 19, to the amount of wire radius compensation for machining route calculation Dc. Thus, amounts of wire radius compensation adjustment can be selected as appropriate to wire electrodes supplied by different wire electrode manufacturers.

[Step SA07] The target shape is offset by the amount of wire radius compensation for machining route calculation Dc and a machining route is created.

[Step SA08] Decision is made whether or not all the blocks of the machining program have been analyzed. If all the blocks have been analyzed (YES), the process ends. If all the blocks have not been analyzed (NO), the flow returns to step SA02, where processing is continued.

The invention claimed is:

1. A wire electric discharge machining method for moving a wire electrode relative to a workpiece according to a machining program and machining the workpiece into a desired target shape, the method comprising the steps of:
    analyzing the machining program;
    creating a target shape for the workpiece based on a result of analysis of the machining program;
    storing an amount of wire radius compensation for the wire electrode;
    setting a plurality of amounts of wire radius compensation adjustment by which the amount of wire radius compensation for the wire electrode is adjusted;
    storing the plurality of amounts of wire radius compensation adjustment that have been set;
    selecting one or more desired amounts of wire radius compensation adjustment from the stored amounts of wire radius compensation adjustment;
    computing an amount of wire radius compensation for machining route calculation by adding the selected amounts of wire radius compensation adjustment to the amount of wire radius compensation;
    creating a machining route which is offset from the created target shape by the computed amount of wire radius compensation for machining route calculation; and
    moving the wire electrode relative to the workpiece according to the created machining route.

2. The method according to claim 1, wherein at least one of the plurality of amounts of wire radius compensation adjustment is set at the wire radius compensation adjustment amount setting step based on a dimensional difference between the desired target shape for the workpiece and an actually-machined shape of the workpiece.

3. The method according to claim 1, wherein at least one of the plurality of amounts of wire radius compensation adjustment is set at the wire radius compensation adjustment amount setting step as a finishing allowance with respect to the desired target shape for the workpiece.

4. A controller for a wire electric discharge machine for moving a wire electrode relative to a workpiece according to a machining program and for machining the workpiece into a desired target shape, the controller comprising:
    a storage; and
    a processor, wherein
    the storage is configured to store
        the machining program, and
        an amount of wire radius compensation for the wire electrode;
    the processor is configured to
        perform an analysis of the machining program stored in the storage,
        create a target shape for the workpiece based on a result of the analysis of the machining program, and
        set a plurality of amounts of wire radius compensation adjustment by which the amount of wire radius compensation for the wire electrode is adjusted;
    the storage is further configured to
        store the plurality of amounts of wire radius compensation adjustment set by the processor; and
    the processor is further configured to
        select one or more amounts of wire radius compensation adjustment from the plurality of amounts of wire radius compensation adjustment stored in the storage,
        compute an amount of wire radius compensation for machining route calculation by adding the selected one or more amounts of wire radius compensation adjustment to the amount of wire radius compensation, and
        create a machining route which is offset from the created target shape by the amount of wire radius compensation for machining route calculation that has been computed.

5. A wire electric discharge machine for machining a workpiece into a desired target shape, the wire electric discharge machine comprising:
    a wire electrode;
    a plurality of drive axes;
    a storage; and
    a processor, wherein
    the storage is configured to store
        a machining program, and
        an amount of wire radius compensation for the wire electrode;
    the processor is configured to
        perform an analysis of the machining program stored in the storage,
        create a target shape for the workpiece based on a result of the analysis of the machining program, and
        set a plurality of amounts of wire radius compensation adjustment by which the amount of wire radius compensation for the wire electrode is adjusted;
    the storage is further configured to
        store the plurality of amounts of wire radius compensation adjustment set by the processor; and
    the processor is further configured to
        select one or more amounts of wire radius compensation adjustment from the plurality of amounts of wire radius compensation adjustment stored in the storage,
        compute an amount of wire radius compensation for machining route calculation by adding the selected one or more amounts of wire radius compensation adjustment to the amount of wire radius compensation, create a machining route which is offset from the created target shape by the amount of wire radius compensation for machining route calculation that has been computed, and control the plurality of drive axes to move the wire electrode relative to the workpiece according to the created machining route for machining the workpiece.

6. The controller according to claim 4, wherein the processor is configured to set at least one of the plurality of amounts of wire radius compensation adjustment based on a dimensional difference between the desired target shape for the workpiece and an actually-machined shape of the workpiece.

7. The controller according to claim 4, wherein the processor is configured to set at least one of the plurality of amounts of wire radius compensation adjustment as a finishing allowance with respect to the desired target shape for the workpiece.

8. The wire electric discharge machine according to claim 5, wherein the processor is configured to set at least one of the plurality of amounts of wire radius compensation adjustment based on a dimensional difference between the desired target shape for the workpiece and an actually-machined shape of the workpiece.

9. The wire electric discharge machine according to claim 5, wherein the processor is configured to set at least one of the plurality of amounts of wire radius compensation adjustment as a finishing allowance with respect to the desired target shape for the workpiece.

* * * * *